(12) United States Patent
Kim et al.

(10) Patent No.: US 7,298,688 B2
(45) Date of Patent: Nov. 20, 2007

(54) LIGHT EMITTING MODULE AND OPTICAL PICKUP APPARATUS AND METHOD EMPLOYING THE SAME

(75) Inventors: Bong-Gi Kim, Suwon-si (KR); Soo-Han Park, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 544 days.

(21) Appl. No.: 10/985,968

(22) Filed: Nov. 12, 2004

(65) Prior Publication Data

US 2005/0094541 A1    May 5, 2005

(51) Int. Cl.
*G11B 7/00* (2006.01)
(52) U.S. Cl. .................. 369/121; 369/116; 369/112.01
(58) Field of Classification Search ...................... None
See application file for complete search history.

(56) References Cited

U.S. PATENT DOCUMENTS

2002/0093902 A1* 7/2002 Hirai et al. ............ 369/112.17

FOREIGN PATENT DOCUMENTS

| JP | 08-307006 | 11/1996 |
|---|---|---|
| JP | 2002-8262 | 1/2002 |

* cited by examiner

*Primary Examiner*—Muhammad Edun
(74) *Attorney, Agent, or Firm*—Roylance, Abrams, Berdo & Goodman, L.L.P.

(57) ABSTRACT

A light emitting module and method for shaping a beam via a beam shaping window and an optical pickup apparatus employing the same. The light emitting module includes a base, a semiconductor laser that is installed on the base and emits a laser beam of a predetermined wavelength, a cap surrounding the semiconductor laser, a beam shaping window that is fitted with a predetermined portion of the cap corresponding to the propagation path of the laser beam and shapes a transmitted laser beam while reflecting a portion of an incident beam, and a monitor photodetector that is disposed within the cap and receives the laser beam reflected by the beam shaping window in order to monitor the laser beam emitted by the semiconductor laser.

18 Claims, 5 Drawing Sheets

LIGHT EMITTING MODULE AND OPTICAL PICKUP APPARATUS AND METHOD EMPLOYING THE SAME

CROSS REFERENCE TO RELATED APPLICATIONS

This application is related to Korean Patent application No. 2002-777587 filed on Dec. 7, 2002, and laid open on Jun. 12, 2004, in the Korean Intellectual Property Office, the entire contents of which is incorporated herein by reference.

BACKGROUND OF THE INVENTION

1. Field of the Invention

The present invention relates to a light emitting module designed to shape a beam emitted by a light source and an optical pickup apparatus and method employing the same. More particularly, the present invention relates to a light emitting module designed to shape a beam using a beam shaping window and an optical pickup apparatus and method employing the same.

2. Description of the Related Art

In general, a light emitting module is employed in an optical pickup apparatus to perform non-contact recording and/or reproduction of information on an optical recording medium and includes a light source that emits a laser beam and a monitor photodetector that monitors the light output power of the laser beam emitted by the light source.

Referring to FIG. 1, a conventional light emitting module includes a cap 3 that is disposed on a base 1 and has a window 5 that transmits a laser beam, a mount 2 disposed on the base 1, a semiconductor laser 10 that is disposed on a sidewall of the mount 2 and emits a laser beam having a predetermined wavelength in two side directions, and a monitor photodetector 7 that is disposed on the base 1 and receives a beam $L_2$ emitted by the semiconductor laser 10 in the backward direction. The monitor photodetector 7 monitors the light output power of a laser beam $L_1$ emitted in the forward direction of the semiconductor laser 10 based on a detected signal. The semiconductor laser 10 and the monitor photodetector 7 are connected to leads 9 used as conducting lines to carry current.

Referring to FIG. 2, a laser beam emitted at a predetermined position of an active layer 11 of the semiconductor laser 10 has an elliptical cross-section. The elliptical beam profile is due to a difference in the angle that a laser beam emitted in a thickness direction of the active layer 11 and a width direction perpendicular thereto will diffract. The difference in diffraction angles is caused by a difference in the size of the beam exits. In this case, the laser beams in the thickness (Y-axis) direction and in the width (X-axis) direction appear to have been emitted from the front of the laser 10 and a location that is a distance $\Delta Z$ behind the front of the laser 10, respectively. Here, the distance difference $\Delta Z$ is called astigmatism. In FIG. 2, $\theta_{81}$ and $\theta_{\perp}$ denote angles in the horizontal and vertical directions, respectively that the beam diverges in.

When the light emitting module is employed in an optical pickup apparatus, astigmatism occurs due to the geometry and structure of a light source. Large amounts of astigmatism results in degradation in jitter characteristics when a signal reflected from an optical recording medium is reproduced through a main photodetector of the optical pickup apparatus. This adversely affects the quality of a detected signal. Here, jitter refers to a displacement or deviation of a signal from its ideal location caused by defects in pits recorded on the optical recording medium or the asymmetric shape of a beam spot created on the optical recording medium.

Since the jitter in particular severely degrades the quality of information being stored on the optical storage medium, there is a need for beam shaping in order to use the light emitting module in an optical pickup apparatus for recording.

As a solution for beam shaping, a beam shaping prism configured as shown in FIG. 3 has been proposed. Referring to FIG. 3, a conventional beam shaping prism 20 includes an incident surface 21 on which a laser beam is incident and which is disposed opposite a semiconductor laser 10 and a reflecting surface 23 that reflects the incident laser beam. The beam shaping prism 20 is optically arranged such that the incident surface 21 is inclined at an angle to the semiconductor laser 10 and refracts a laser beam emitted by the semiconductor laser 10.

The beam emitted by the semiconductor laser 10 has an elliptical cross-section indicated by dotted line A. The elliptical beam is refracted through the incident surface 21, reflected off the reflecting surface 23, and transformed into a circular profile indicated by dotted line B.

However, use of the conventional beam shaping prism having the above-described configuration requires large assembling tolerances as well as high manufacturing costs due to a complicated optical structure. Furthermore, there is a high possibility that an optical axis will deviate during high-temperature operation.

SUMMARY OF THE INVENTION

The present invention provides a light emitting module with a simple structure which is designed to shape a beam using a window that protects the inside of the module from foreign materials such as dust particles and an optical pickup apparatus and method employing the light emitting module.

According to an aspect of the present invention, there is provided a light emitting module and method including a base, a semiconductor laser that is installed on the base and emits a laser beam of a predetermined wavelength, a cap surrounding the semiconductor laser, and a beam shaping window that is fitted with a predetermined portion of the cap corresponding to the propagation path of the laser beam and shapes a transmitted laser beam while reflecting a portion of an incident beam. The light emitting module further includes a monitor photodetector that is disposed within the cap and receives the laser beam reflected by the beam shaping window in order to monitor the laser beam emitted by the semiconductor laser.

Here, the beam shaping window includes a first surface that is inclined at an angle to an optical axis of a laser beam emitted by the semiconductor laser and refracts a majority of an incident beam while reflecting the remaining portion of the beam; and a second surface that is perpendicular to the propagation direction of the beam refracted through the first surface and directs an incident beam.

According to another aspect of the present invention, there is provided an optical pickup apparatus and method including a semiconductor laser that emits a laser beam of a predetermined wavelength; a beam shaping window that is disposed in the propagation path of the laser beam and shapes a transmitted beam into a beam having a circular cross-section while reflecting a portion of the incident beam; a light path changer that is disposed in the propagation path of the laser beam emitted by the semiconductor laser and changes the propagation path of an incident beam; an objective lens that focuses an incident laser beam to a beam spot on an optical recording medium; and a main photodetector that receives a laser beam that is reflected from the optical recording medium and passes through the objective lens and the light path changer in order to detect an information signal and an error signal.

BRIEF DESCRIPTION OF THE DRAWINGS

The above and other features and advantages of the present invention will become more apparent by describing in detail exemplary embodiments thereof with reference to the attached drawings in which.

Throughout the drawings, it should be noted that the same or similar elements are denoted by like reference numerals.

DETAILED DESCRIPTION OF EXEMPLARY EMBODIMENTS

Figure 4:
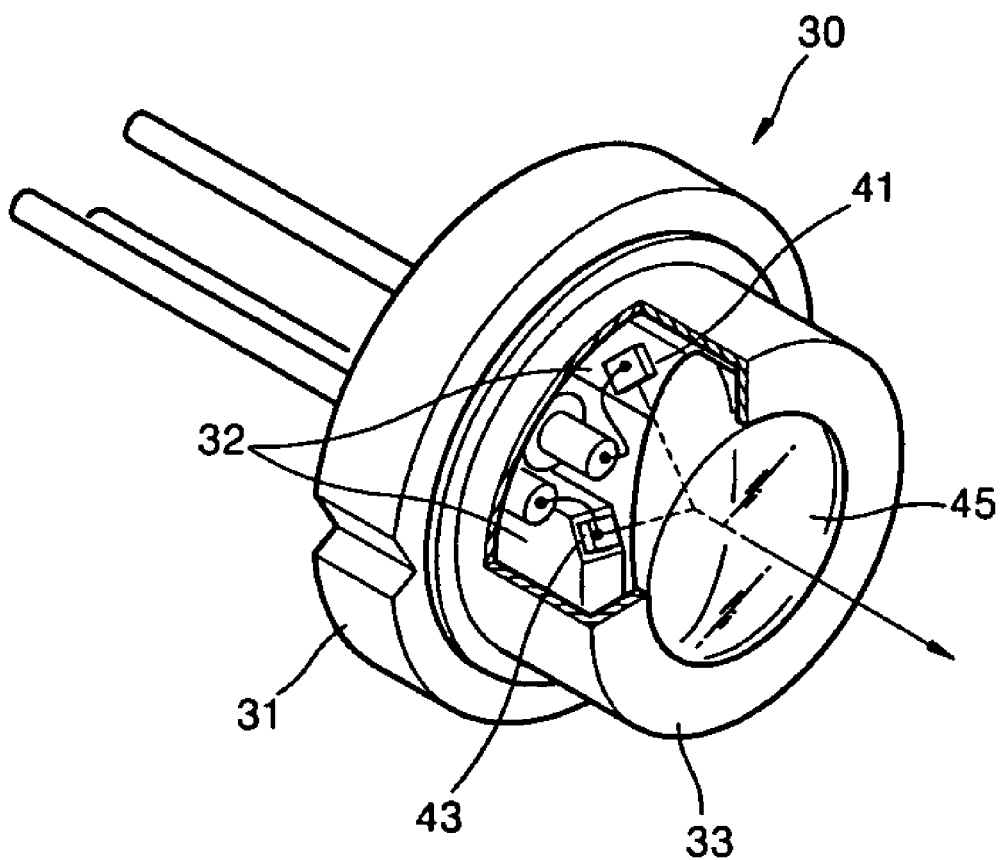
FIG. 4 is a partially broken away perspective view of a light emitting module according to an embodiment of the present invention.

Referring to FIG. 4, a light emitting module 30 according to an embodiment of the present invention includes a base 31, a semiconductor laser 41 and a monitor photodetector 43 disposed on the base 31, a cap 33 surrounding the semiconductor laser 41 and the monitor photodetector 43, and a beam shaping window 45 disposed in a propagation path of a laser beam.

The semiconductor laser 41 is installed on a mount 32 disposed on the base 31 and emits a laser beam of a predetermined wavelength toward the beam shaping window 45. The wavelength of the laser beam emitted from the semiconductor laser 41 is 655 nm, 408 nm, or 785 nm and is not limited to a specific wavelength.

The cap 33 encases the semiconductor laser 41 and the monitor photodetector 43 and protects the same against external contamination. The beam shaping window 45 is combined with a predetermined portion of the cap 33 disposed in the propagation path of the laser beam and shapes the transmitted laser beam while reflecting a portion of the incident beam toward the monitor photodetector 43.

Figure 5:
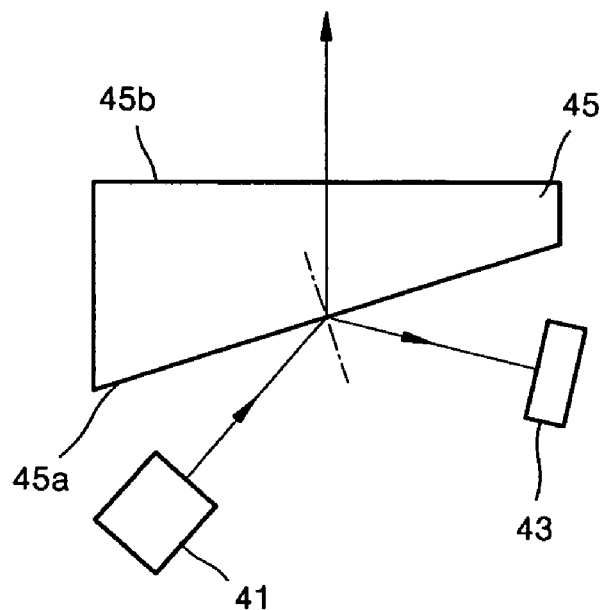
FIG. 5 shows optical arrangement of a light emitting module according to an embodiment of the present invention.

Referring to FIG. 5, the beam shaping window 45 has a first surface 45a on which a laser beam is incident and a second surface 45b that the laser beam exits. Since the first surface 45a is slanted at an angle to an optical axis of the laser beam emitted by the semiconductor laser 41, most of the incident beam is refracted while the remaining portion of the beam is reflected toward the monitor photodetector 43. To this end, the first surface 45a can be coated to refract approximately 90% of the incident beam and reflect the remaining portion of the beam toward the monitor photodetector 43. The second surface 45b is perpendicular to the propagation direction of the beam refracted through the first surface 45a and directs most of the incident beam. To this end, the second surface 45b can be coated to direct approximately 99% of the incident beam. By constructing the beam shaping window 45 in this manner, it is possible to shape an exit beam into a desired profile.

Figure 6:
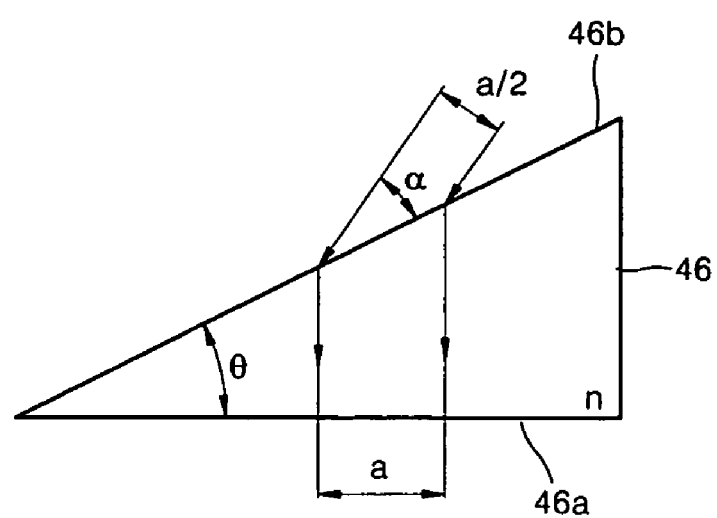
FIG. 6 is a diagram for explaining a beam shaping principle of a beam shaping window according to an embodiment of the present invention.

A beam shaping principle will now be described with reference to FIG. 6. Referring to FIG. 6, a beam shaping prism 46 according to an embodiment of the present invention, corresponding to the beam shaping window (45 of FIG. 5), is a transparent element having a refractive index n and has a base plane 46a and an inclined plane 46b slanted at an angle θ to the base plane 46a. FIG. 6 shows that a laser beam is incident on the inclined plane 46b at an angle α and exits through the base plane 46a.

For example, where an incident beam and a corresponding exit beam have a cross-sectional diameters of a/2 and, respectively, and the beam shaping prism 46 is a medium having a refractive index $n_d$ of 1.514362, the angles θ and α are set as shown in Equations (1) and (2). The angles θ and α can be determined by simultaneously solving Equation (1) representing Snell's law and Equation (2) associated with a geometric shape:

$$\sin(90-\alpha) = n_d \sin\theta \quad (1)$$

$$2\sin\alpha = \cos\theta \quad (2)$$

The angles θ and α that satisfy the Equations (1) and (2) at the same time are 37.29° and 23.44°, respectively.

Figure 1:
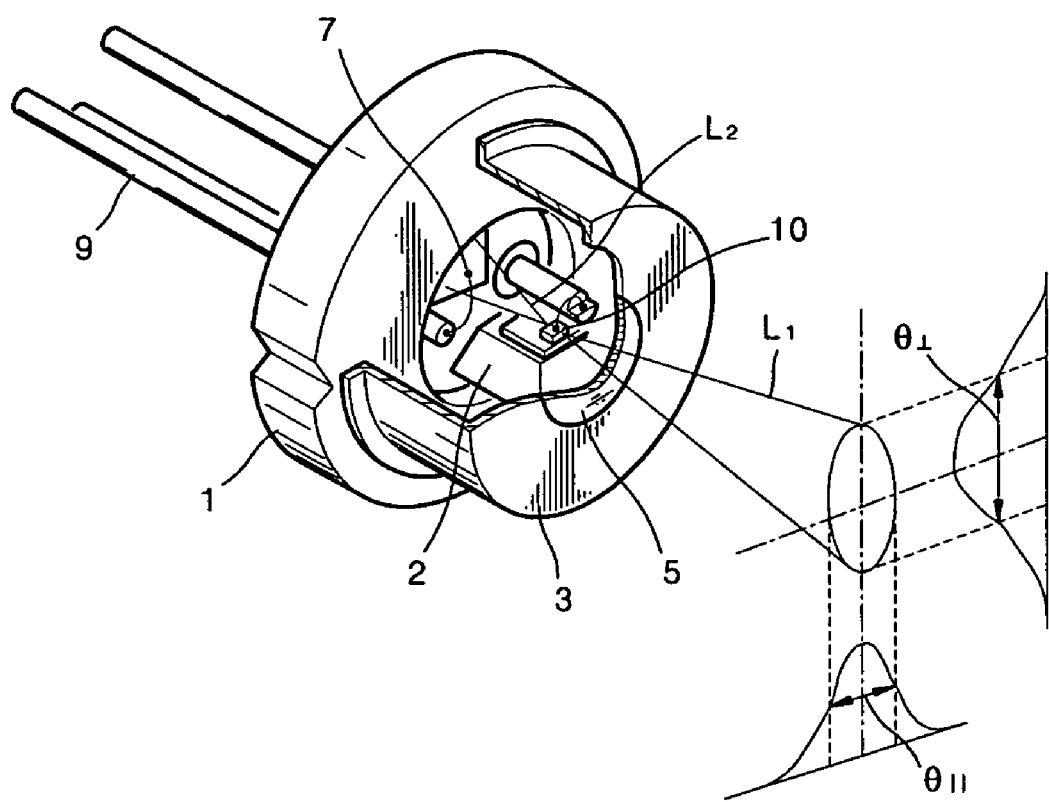
FIG. 1 is a partially broken away perspective view of a conventional light emitting module.
Figure 2:
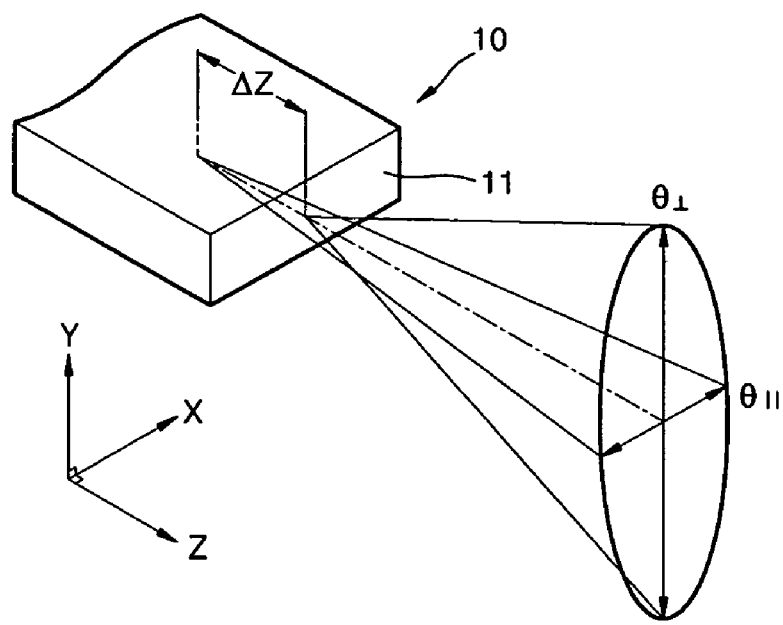
FIG. 2 is a schematic diagram of a conventional semiconductor laser.
Figure 3:
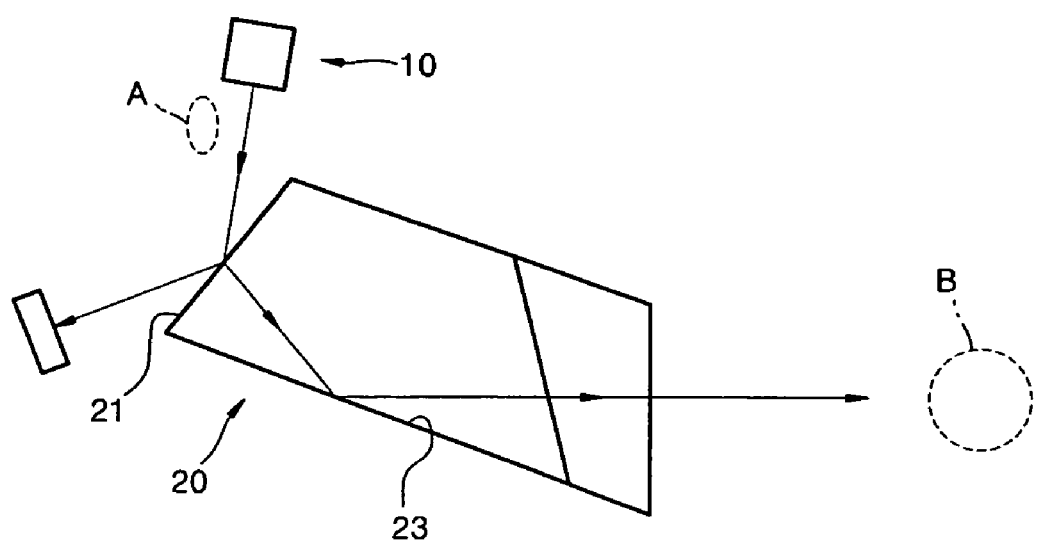
FIG. 3 shows optical arrangement of a conventional laser beam shaping prism.

The above example illustrates a beam entering the beam shaping prism 46 in one direction, such as the horizontal direction (the $\theta_\parallel$ direction shown in FIG. 1). The beam-shaping prism 46 also allows a beam incident in the vertical direction (the $\theta_{195}$ direction shown in FIG. 1) to be transmitted without changing the diameter of the beam. Thus, when a laser beam with an elliptical cross-section enters the beam-shaping prism 46, the beam-shaping prism 46 allows the elliptical beam to be transformed into a circular beam and produce an exit laser beam of a desired diameter by determining predetermined values as the angles θ and α.

Referring to FIGS. 4 and 5, the monitor photodetector 43 is fitted onto a predetermined location of a mount 32 installed on the base 31 and receives a portion of a laser beam reflected from the first surface 45a of the beam shaping window 45 and monitors the laser beam emitted by the semiconductor laser 41.

The monitor photodetector 43 is disposed within the cap 33, thus making the light emitting module compact. Furthermore, an embodiment of the present invention allows the monitor photodetector 43 to receive a portion of the laser beam emitted by the semiconductor laser 41 in the forward direction and monitor light emission from the semiconductor laser 41, thereby enabling an auto power controller (APC) circuit disposed between the monitor photodetector 43 and the semiconductor laser 41 to more precisely control the light output power of the semiconductor laser 41.

Figure 7:
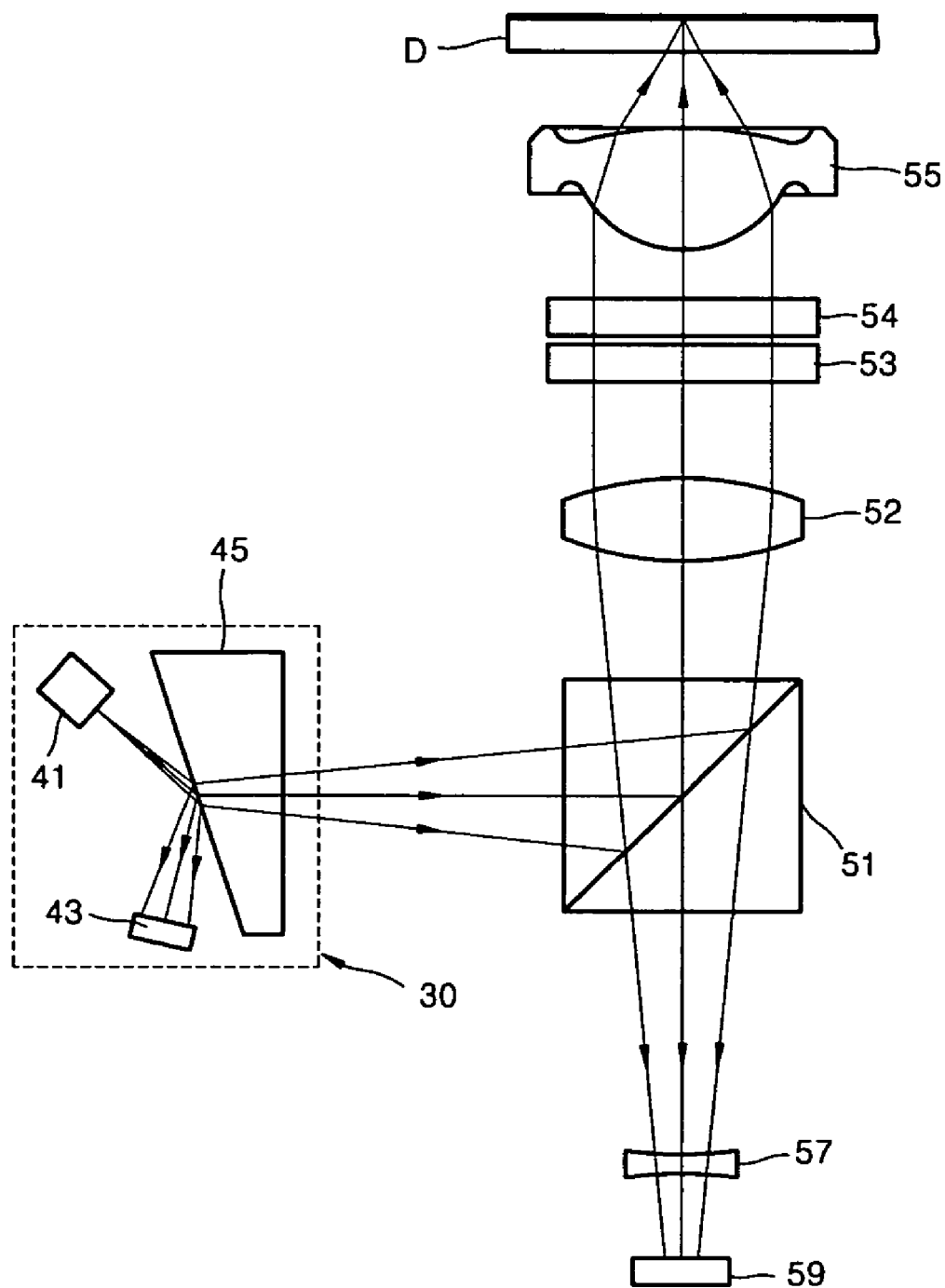
FIG. 7 is a schematic diagram showing the optical arrangement of an optical pickup apparatus employing a light emitting module according to an embodiment of the present invention.

Referring to FIG. 7, an optical pickup apparatus according to an embodiment of the present invention includes a light emitting module 30, a light path changer 51 that changes the propagation path of an incident beam, an objective lens 55 that focuses the incident beam onto an optical recording medium D, and a main photodetector 59 that receives a beam reflected from the optical recording medium D. The light emitting module 30 includes a semiconductor laser 41 that emits a laser beam having a predetermined wavelength, a beam shaping window 45 that shapes the beam emitted by the semiconductor laser 41 and reflects a portion of the incident beam, and a monitor photodetector 43 that receives the beam reflected by the beam shaping window 45 and monitors the laser beam emitted by the semiconductor laser 41.

The light emitting module 30 further includes a base 31 and a cap 33 for arranging the optical elements as shown in FIG. 4. Since the light emitting module 30 has substantially the same construction as that described with references to FIGS. 4 through 6, a detailed description thereof will not be given.

The light path changer 51 disposed in an optical path between the light emitting module 30 and the objective lens 55 reflects the beam emitted by the light emitting module 30 toward the optical recording medium D and transmits the beam reflected from the optical recording medium D toward the main photodetector 59.

FIG. 7 shows that the light path changer 51 is a polarization beam splitter that transmits or reflects the incident beam depending on its polarization direction. The polarization beam splitter reflects a beam emitted having one polarization by the semiconductor laser 41 toward the objective lens 55 and transmits a beam having the other polarization toward the main photodetector 59. To achieve this function, the optical pickup apparatus further includes a quarter wave plate 54 and a polarization holographic optical element 53 disposed in an optical path between the polarization beam splitter and the objective lens 55. The quarter wave plate 54 converts an incident linearly polarized beam into a circularly polarized beam or vice versa. The polarization holographic optical element 53 directs the entire vertically polarized beam while acting as a hologram to diffract a horizontally polarized beam and change the path of propagation. Thus, only a vertically polarized beam is directed to the polarization beam splitter among those reflected from the optical recording medium D, passes through the polarization beam splitter, and is incident on the main photodetector 59. By constructing the light path changer 51 in this manner, it is possible to prevent the laser beam reflected from the optical recording medium D from traveling toward the monitor photodetector 43, so that the reflected laser beam has no adverse effects on controlling the light output power of the semiconductor laser 41.

Meanwhile, instead of the polarization beam splitter, the light path changer 51 may be a beam splitter that transmits or reflects the incident beam at a predetermined ratio or a holographic optical element that directs a beam emerging from one direction and diffracts a beam emerging from another direction in order to change the path of propagation. When the light path changer 51 is the beam splitter, a flat plate beam splitter may be used instead of the cubic beam splitter as shown in FIG. 7. The optical pickup apparatus may further include a collimating lens 52 that is disposed in an optical path between the light path changer 51 and the objective lens 55 and collimates an incident divergent beam to a parallel beam.

The main photodetector 59 receives a laser beam that is reflected from the optical recording medium D and passes through the objective lens 55 and the light path changer 51 in order to detect an information signal and error signals. Here, a concave lens 57 can be disposed between the light path changer 51 and the main photodetector 59 in order to change the optical axis length and cross-sectional diameter of a beam traveling toward the main photodetector 59.

By changing the structure of a window that protects the inside of the light emitting module against dust particles, it is possible to shape a beam into a desired profile, simplify the structure of the light emitting module, and lower the manufacturing costs. By monitoring a portion of the laser beam emitted in forward direction of a semiconductor laser, it is also possible to precisely control the light output power of the laser.

Furthermore, the optical pickup apparatus employing the light emitting module having the above-described configuration prevents a laser beam reflected from an optical recording medium D from traveling toward the monitor photodetector 43, so that the laser beam does not have an effect on controlling the light output power of the semiconductor laser. The embodiments of the present invention also solve astigmatism problems by transforming an elliptical laser beam incident through a beam shaping window into a circular laser beam. This improves jitter characteristics during reproduction of information.

While the present invention has been particularly shown and described with reference to exemplary embodiments thereof, it should be understood by those of ordinary skill in the art that various changes in form and details may be made therein without departing from the spirit and scope of the present invention as defined by the following claims.

What is claimed is:

1. A light emitting module comprising:
   a base;
   a semiconductor laser that is installed on the base and emits a laser beam of a predetermined wavelength;
   a cap surrounding the semiconductor laser; and
   a beam shaping window that is fitted with a predetermined portion of the cap corresponding to the propagation path of the laser beam and shapes a transmitted laser beam while reflecting a portion of an incident beam.

2. The light emitting module of claim 1, further comprising a monitor photodetector that is disposed within the cap and receives the laser beam reflected by the beam shaping window in order to monitor the laser beam emitted by the semiconductor laser.

3. The light emitting module of claim 2, wherein the beam shaping window comprises:
   a first surface that is inclined at an angle to an optical axis of the laser beam emitted by the semiconductor laser and refracts most of an incident beam while reflecting the remaining portion of the beam; and
   a second surface that is perpendicular to the propagation direction of the beam refracted through the first surface and directs an incident beam.

4. The light emitting module of claim 3, wherein the first surface is coated to refract approximately 90% of the beam emitted by the semiconductor laser and reflects the remaining portion of the beam toward the monitor photodetector.

5. The light emitting module of claim 1, wherein the beam shaping window comprises:
   a first surface that is inclined at an angle to an optical axis of a laser beam emitted by the semiconductor laser and refracts most of an incident beam while reflecting the remaining portion of the beam; and
   a second surface that is perpendicular to the propagation direction of the beam refracted through the first surface and directs an incident beam.

6. The light emitting module of claim 5, wherein the first surface is coated to refract approximately 90% of the beam emitted by the semiconductor laser and reflects the remaining portion of the beam toward the monitor photodetector.

7. An optical pickup apparatus comprising:
   a semiconductor laser that emits a laser beam of a predetermined wavelength;
   a beam shaping window that is disposed in the propagation path of the laser beam and shapes a transmitted beam into a beam having a circular cross-section while reflecting a portion of the incident beam;
   a light path changer that is disposed in the propagation path of the laser beam emitted by the semiconductor laser and changes the propagation path of an incident beam;
   an objective lens that focuses an incident laser beam into a beam spot onto an optical recording medium; and
   a main photodetector that receives a laser beam that is reflected from the optical recording medium and passes through the objective lens and the light path changer in order to detect an information signal and error signals.

8. The apparatus of claim 7, further comprising a monitor photodetector that receives the beam reflected by the beam shaping window and monitors the laser beam emitted by the semiconductor laser.

9. The apparatus of claim 8, wherein the beam shaping window comprises:
   a first surface that is inclined at an angle to an optical axis of the laser beam emitted by the semiconductor laser and refracts most of an incident beam while reflecting the remaining portion of the beam; and
   a second surface that is perpendicular to the propagation direction of the beam refracted through the first surface and directs an incident beam.

10. The apparatus of claim 9, wherein the first surface is coated to refract approximately 90% of the beam emitted by the semiconductor laser and reflect the remaining portion of the beam toward the monitor photodetector.

11. The apparatus of claim 7, wherein the beam shaping window comprises:
   a first surface that is inclined at an angle to an optical axis of the laser beam emitted by the semiconductor laser and refracts most of an incident beam while reflecting the remaining portion of the beam; and
   a second surface that is perpendicular to the propagation direction of the beam refracted through the first surface and directs an incident beam.

12. The apparatus of claim 11, wherein the first surface is coated to refract approximately 90% of the beam emitted by the semiconductor laser and reflect the remaining portion of the beam toward the monitor photodetector.

13. A method for An optical pickup apparatus comprising:
   emitting a laser beam of a predetermined wavelength via a semiconductor laser;
   shaping a transmitted beam into a beam having a circular cross-section while reflecting a portion of an incident beam via a beam shaping window that is disposed in the propagation path of the laser beam;
   changing the propagation path of the incident beam via a light path changer that is disposed in the propagation path of the laser beam emitted by the semiconductor laser;
   focusing the incident laser beam into a beam spot on an optical recording medium via an objective lens; and
   receiving a laser beam that is reflected from the optical recording medium and passes through the objective lens and the light path changer in order to detect an information signal and error signals via a main photodetector.

14. The method of claim 13, further comprising:
   receiving the beam reflected by the beam shaping window and monitoring the laser beam emitted by the semiconductor laser via a monitor photodetector.

15. The method of claim 14, wherein the step of receiving further comprises:
   providing a first surface that is inclined at an angle to an optical axis of the laser beam emitted by the semiconductor laser and refracting most of an incident beam while reflecting the remaining portion of the beam; and
   providing a second surface that is perpendicular to the propagation direction of the beam refracted through the first surface and directing an incident beam.

16. The method of claim 15, wherein the first step of providing further comprises:
   coating the first surface to refract approximately 90% of the beam emitted by the semiconductor laser and reflecting the remaining portion of the beam toward the monitor photodetector.

17. The method of claim 13, wherein the step of shaping further comprises:
   providing a first surface that is inclined at an angle to an optical axis of the laser beam emitted by the semiconductor laser and refracting most of an incident beam while reflecting the remaining portion of the beam; and
   providing a second surface that is perpendicular to the propagation direction of the beam refracted through the first surface and directing an incident beam.

18. The method of claim 17, wherein the first surface is coated to refract approximately 90% of the beam emitted by the semiconductor laser and reflects the remaining portion of the beam toward the monitor photodetector.

* * * * *